United States Patent
Gits et al.

(10) Patent No.: US 7,185,027 B2
(45) Date of Patent: Feb. 27, 2007

(54) EVOLVING ENTRIES WITHIN PERSISTENT STORES IN A SCALABLE INFRASTRUCTURE ENVIRONMENT

(75) Inventors: Peter Michael Gits, Clarendon Hills, IL (US); David Jeremey Novice, Baltimore, MD (US); Dale J. Seavey, Sunol, CA (US)

(73) Assignee: Cisco Technology, Inc., San Jose, CA (US)

( * ) Notice: Subject to any disclaimer, the term of this patent is extended or adjusted under 35 U.S.C. 154(b) by 386 days.

(21) Appl. No.: 10/194,870

(22) Filed: Jul. 11, 2002

(65) Prior Publication Data
US 2004/0199551 A1    Oct. 7, 2004

(51) Int. Cl.
G06F 17/30    (2006.01)
G06F 15/16    (2006.01)

(52) U.S. Cl. ............ 707/203; 707/200; 707/202; 709/206; 709/227

(58) Field of Classification Search ............ 707/1, 707/2, 3, 4, 10, 100, 104.1, 201, 203, 206; 717/120, 170
See application file for complete search history.

(56) References Cited

U.S. PATENT DOCUMENTS

| | | | |
|---|---|---|---|
| 5,261,098 A * | 11/1993 | Katin et al. .................... 707/1 |
| 5,649,200 A | 7/1997 | Leblang et al. .............. 717/122 |
| 6,460,052 B1 * | 10/2002 | Thomas et al. .............. 707/203 |
| 2002/0073110 A1 * | 6/2002 | Duvillier et al. ............. 707/206 |
| 2002/0103819 A1 * | 8/2002 | Duvillier et al. ............. 707/206 |
| 2003/0225840 A1 * | 12/2003 | Glassco et al. .............. 709/206 |
| 2004/0055005 A1 * | 3/2004 | Creswell et al. ............. 719/315 |

OTHER PUBLICATIONS

Freeman, Eric and Hupfer, Susan, "Make Room for Javaspaces, Part I," Nov. 1999 (8 pages) http://www.artima.com/jini/jiniology/js1P.html.
Plaice, John and Kropf, Peter G., "Intensional Communities," *World Scientific*, Singapore 2000, pp. 292-295.
Feeley, Michael J. and Levy, Henry M., "Distributed Shared Memory with Versioned Objects," ACM Sigplan Notices, Association for Computing Machinery, New York, US, vol. 27, No. 10, Oct. 1, 1992 (pp. 247-262).
"EVOLVE Object Database for JINI," Feb. 25, 1999 URL:http://archives.java.sun.com/cgi-bin/wa?A2=ind9902&L=javaspaces-users&F=&S=&P=8561 (2 pages).

* cited by examiner

*Primary Examiner*—Jeffrey Gaffin
*Assistant Examiner*—Hassah Mahmoudi
(74) *Attorney, Agent, or Firm*—Marger Johnson & McCollom, P.C.

(57) ABSTRACT

A method of providing evolvable entries in a persistent store is described. The method includes receiving an entry from an agent destined for the persistent store. The entry is converted to a versioned entry inserted into the persistent store. If a read or take operation is instituted, the versioned entry is read from the persistent store and converted to an entry.

14 Claims, 3 Drawing Sheets

EVOLVING ENTRIES WITHIN PERSISTENT STORES IN A SCALABLE INFRASTRUCTURE ENVIRONMENT

BACKGROUND

1. Field

This disclosure relates to an environment employing persistent stores, more particularly to entries in a virtual space created in that environment.

2. Background

Sun Corporation developed Java™, a three-part distributed means for computing. The three parts of Java™ are the Java™ programming language, the Java Virtual Machine™ (JVM) and the Java™ platform.

The Java™ programming language is just that, a programming language with its own syntax, structures and procedures similar to all other languages. It is the language in which Java™ applications such as applets, servlets, and JavaBeans™ components are written. A unique part of the Java™ language, however, is that it does not compile into machine-readable code, as most other languages do. It compiles into byte codes. These byte codes are interpretable by the JVM.

The JVM is the Java™ interpreter. Java™ programs are portable, being in byte code format, but they are only portable to platforms to which a Java™ interpreter has been ported. Fortunately, JVMs are freely available for virtually all types of systems, from desktop systems running Windows, Unix or Macintosh, to cell phones. All of these are capable of being a Java™ platform.

A platform typically identifies a set of application programming interfaces (APIs) typically defined by the operating system. A programmer writing a program to run on a specific operating system such as Windows would use a different set of APIs than a programmer writing a program for the Macintosh operating system. However, the Java™ platform provides APIs that run on any operating system running the Java™ platform. In some respects, the Java™ platform is an intermediate platform between the Java™ code and the operating system. It allows programmer to write a program once and run it anywhere.

Because Java™ code may run on several different operating systems and several different devices, it would seem a logical extension of this would be to connect these all together. Jini serves as the framework to make those connections. Jini is a set of specifications that allows different services to discover each other on a network. The specifications also allow these services to participate in operations on this network; the network is sometimes referred to as a community. However, to avoid confusion in further discussions the network will be referred to as a network or a Jini™ community.

Jini™ focuses on services. A service may also be thought of as a service interface. For example, a certain device such as a server may present an interface to the outside world that is the device API. This API interface is a service. Because Jini™ is a distributed framework, there will be clients and servers. However, these clients and servers only care about the interfaces that allow them access to the other clients and servers. The client or server will know about the particular service API, but does not care about the implementation. For example, there may be a printer on the network. Another member of the network will know that there is a printer API but does not care what kind of printer it is. The print service will allow the member to send a print job to the service and will handle the translation of the print job to the specific API for the printer.

One example of a Jini™ service is JavaSpaces™. Simply, JavaSpaces™ define a persistent store. In terms of the above discussion, a client that wants to use JavaSpaces™ only needs to know the JavaSpaces™ API. The client does not need to know the specifics on what type of server upon which the JavaSpaces™ is implemented.

The Scalable Infrastructure™ system developed by Cisco® Systems provides a fully distributed, scalable infrastructure for communication system built upon Jini™ and JavaSpaces™ (Space). Devices and applications that wish to communicate with other members of a community or outside the community insert objects into the Space. The Space then publishes the presence of that object to subscribed members of the community. Double agents are capable of communicating with any desired protocols on one side and the Space protocol on the other. Non-space specific agents handle routing, administrative and other tasks, such as communication between Spaces and Communities.

However, there are limitations on the use of Spaces in such an application. Entries within a Space are not evolvable. Once the Virtual Machine within the Space implementation has downloaded the class for the entry, no further modifications are allowed. New fields cannot be added, nor current fields removed from entries once they are downloaded, unless the Virtual Machine is restarted. This limits the flexibility and applicability of both JavaSpaces™ and Scalable Infrastructure™ communication systems.

SUMMARY

A method of providing evolvable entries in a persistent store is described. The method includes receiving an entry from an agent destined for the persistent store. The entry is converted to a versioned entry inserted into the persistent store. If a read or take operation is instituted, the versioned entry is read from the persistent store and converted to an entry.

In an embodiment, the conversion is accomplished through an interface to the persistent store and an entry matrix. The entry matrix tracks the changes made and the associated codebases associated with those changes to allow the interface to map between versioned entries and original entries.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
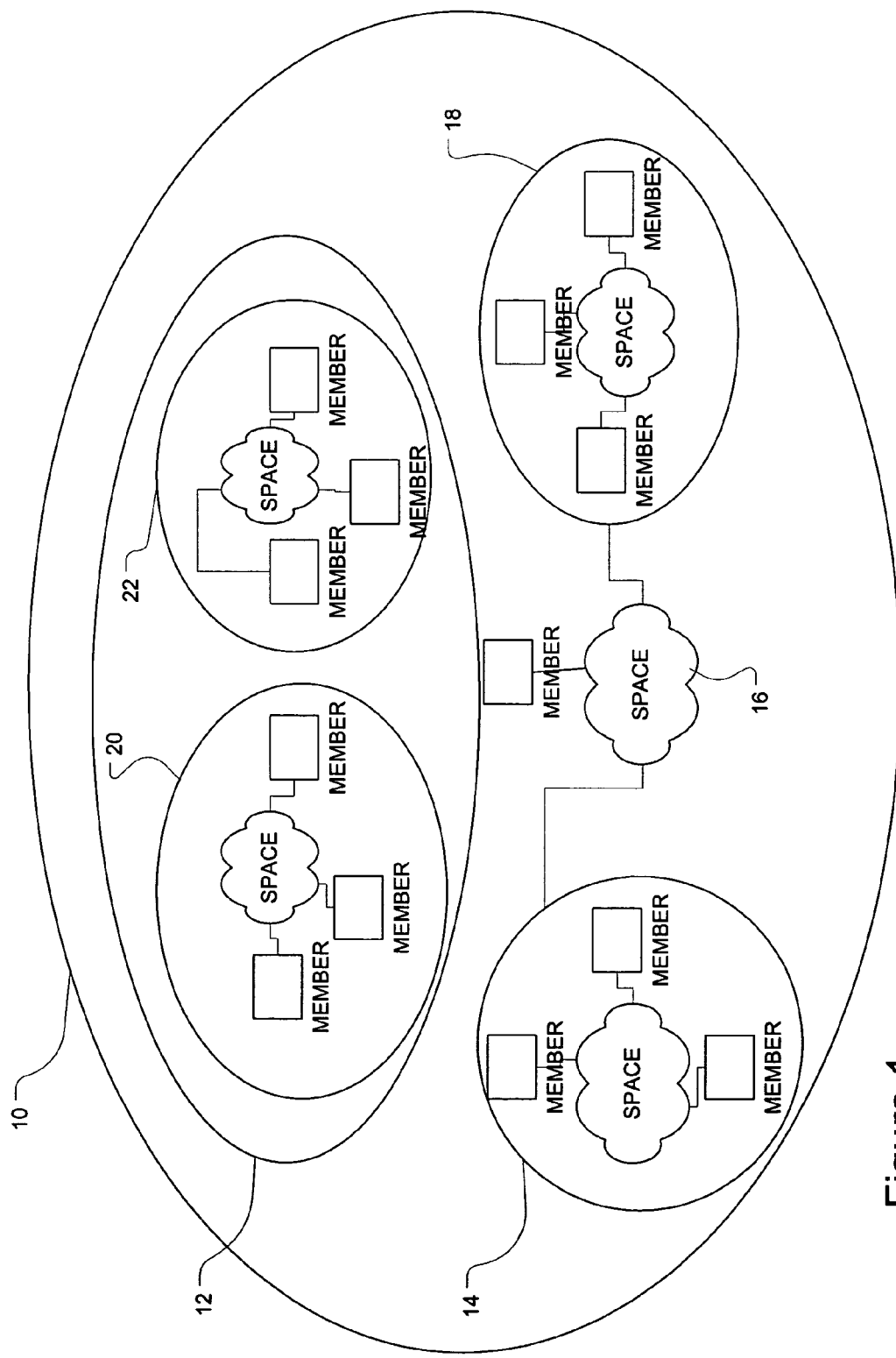
FIG. 1 shows an example of a Scalable Infrastructure system.

FIG. 1 shows an example of a Scalable Infrastructure™ system developed by Cisco® Systems. The system 10 may include several different communities 12, 14, 16 and 18.

Each community has infinite possibilities for members and configurations. For example, community 12 includes two communities 20 and 22, each established around a space with its own members. Space as used here means a persistent store, such as that provided by the JavaSpace™ service of Jini™. In contrast, a community established with space 16 has only one member.

A Community as used here will refer to a collection of these agents and a persistent store. Any type of persistent store could be used, with the capabilities of having objects inserted into the store such that they do not lose their attributes and of providing a notification service as the objects are inserted. In this particular example, JavaSpaces™ will be used as the persistent stores, but the SI system is applicable to any similar technology. For ease of discussion, the persistent stores will be referred to as 'Spaces.' Spaces can be used in several different implementations, and the following discussion is meant only as an example.

It must be noted that the connections shown on this figure would indicate a hard-wired connection, which is typically not the case. This system will more than likely be implemented in software and these connections are virtual connections that dissolve and reform as needed to provide communications between the various members of the communities and between various communities.

The Scalable Infrastructure™ system uses the persistent store in combination with agents to provide communications between various members. For example, a member of community 20 may want to contact a member of community 14. The member's device, such as a phone or personal computer, allows the calling member to place a call. The call results in an object being inserted into the space for the receiving member. The presence of this object is registered by one of many agents and is transferred to the space in community 14. An object is inserted into that space and an agent associated with the receiving member picks it up and the receiving member receives the call.

There are various types of objects, other than phone calls, that may be inserted into the spaces. These objects will be referred to here as entries. Entries are typed groups of objects, expressed in a class that can be written into a space. Writing an entry into a space creates a copy of that entry that can be used in future lookup operations. Lookup operations are generally either read operations or take operations. A read operation returns an entry that matches the read request or indicates that no match was found. A take operation operates like a read, but if a match is found the matching entry is removed from the space.

In some instances, the requirement of matching the entry can lead to problems. Lookup operations generally require that all of the entry objects have some or all of its fields set to specified values that must be matched exactly, remaining fields are wildcards. However, the entry has to have the same fields as the request, or no match will be found. Therefore, if an entry has an added field or removed field, the lookup operation will result in no match being found. In other words, entries are not evolvable.

Figure 2:
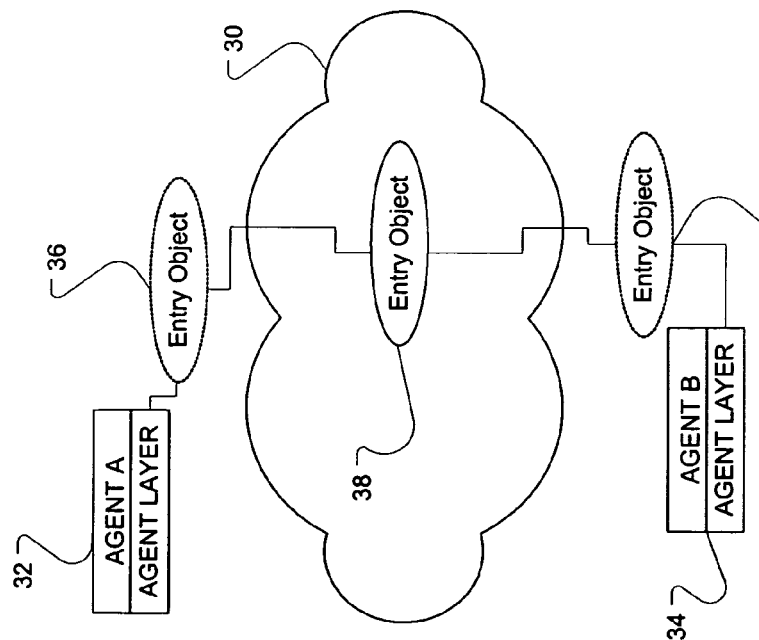
FIG. 2 shows an example of an agent inserting an entry into a persistent store in accordance with the prior art.

Referring now to FIG. 2, an example of how an entry being written into a space currently occurs. Agent A 32 writes an entry that indicates all of the calling preferences for a given user, such as a default phone number, a cell phone number, a page number, etc. The preferences indicate in what order and the specifications of the call routing, such as "call my default number first, let it ring three times and then try my cell phone." This entry will be referred to as a preference entry 36. Similarly, Agent B writes a similar preference entry for the associated user. Either one of these may be discovered by other agents and used, as each has the same basic preference entry template 38, with all of the defined fields.

If Agent B were to attempt to add or remove fields from the entry, it would result in no match. Typically, however, once the class is downloaded by the virtual machine running the space, changes are just prevented by the administrative interface. In order to allow changed fields, the virtual machine would have to be stopped and restarted. This allows the virtual machine to recompile and download classes with new or removed fields. However, this is impractical.

Figure 3:
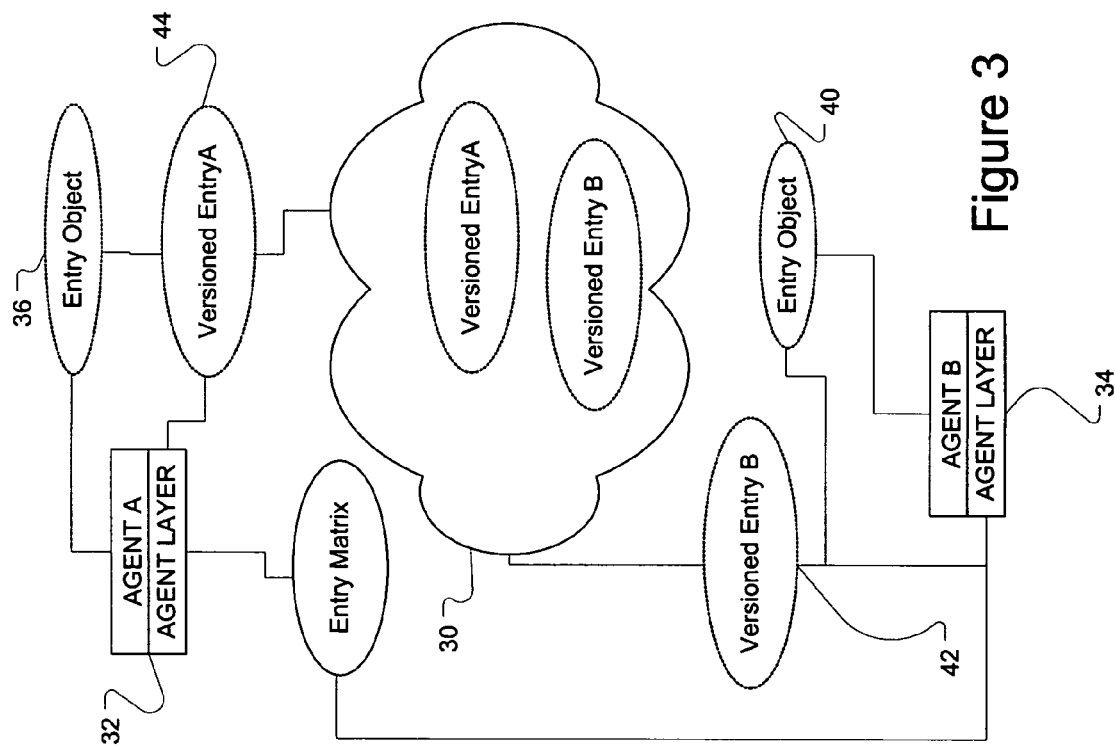
FIG. 3 shows an embodiment of an agent inserting an evolvable entry into a persistent store.

Referring now to FIG. 3, the implementation of the invention results in two versions of the entry to be in existent in the space, each of a different version. Agent B writes an entry 40 that is mapped to a versioned entry 42, such as 'PreferenceEntry_1.2,' which is the entry actually written into the space. Similarly, Agent A writes a preference entry 36 that is mapped to versioned entry a 44, such as 'PreferenceEntry_1.1.' These versioned entries are then written into the space.

In one embodiment, the agent writes the entry by making a call to an interface layer, referred to here as the agent layer. The agent layer then interacts with the entry matrix and writes the versioned entry to the space. In this manner, the agents do not need to 'know' about the entry matrix or the versioning process, they just write the entry as a standard entry and the agent layer handles the versioning.

In an embodiment of the invention, a toolbox is introduced, where the toolbox is used to refer to the administrative interaction with the JavaSpace and the developer making the changes to a particular entry. The following specific example is for ease of discussion only and is not intended to limit application of the invention in any way. The example begins with the developer building the agent that will write the entry and has decided to add some new fields to the entry.

The previous entry may have been:

```
PreferenceEntry extends SiAbstratct Entry {
    Private String versionNumber = "1.1";
    Public String fieldOne;
    Public String fieldTwo;
}
```

The developer then modifies the entry to:

```
            PreferenceEntry extends SiAbstratct Entry {
    Private String versionNumber = "1.1";
    Public String fieldOne;
    Public String fieldTwo;
    Public Boolean bChanged;
    Public Integer iCounter;
}
```

Whether or not the space instance of the entry contains the version 1.1 or 1.2 entries is not material. The cause of the problem lies in having two PreferenceEntry objects. Once the machine has a single entry of the PreferenceEntry, it cannot reload the newer class format and will end with an exception of a 'mismatch type/Entry' when trying to read or take it from the space.

However, using different codebases for each of the version, the two different versions of the entry may be allowed to coexist in the space, even with the different fields. A codebase is the mechanism through which the virtual machine downloads the classes that is has not yet seen via the HyperText Transfer Protocol (HTTP) into its namespace.

The toolbox will be used to both create and update an entry matrix that maintains the versioning information. The entry matrix defines not only the new entries but also what they contain. For example:

```
Public class EntryMatrix extends SiAbstractEntry
public class evolvingentry {
    public integer MajorVersion;
    public Integer MinorVersion;
    public String SiEntryName;
    public String strDateUpdated;
    public String strVersionChangeReason;
    public String strPriorCodebaseUrl;
    public String strCodebaseUrl;
    public String strJavaSource;
    public vector vLinkedListOfEvolvedEntries;
}
public String spaceGuid;
public String spaceName;
public Vector vEvolvableEntries;
    }
```

The toolbox will then populate the entry matrix for each entry that has been changed or modified. Using the previous example, the PreferenceEntry would be one of the elements of the entry matrix with its associated versions. MinorVersion may also be referred to as the version identifier. The entry matrix shown as an example above would be populated as follows:

```
Public class EntryMatrix extends SiAbstractEntry
public class evolvingentry {
    public integer MajorVersion; equal to 1
    public Integer MinorVersion; equal to 1 and two respectively
    (1.1 and 1.2)
    public String EntryName; "PreferenceEntry"
    public String SiEntryName; PreferenceEntry__1.1 and
    PreferenceEntry__1.2
    public String strDateUpdated; the date
    public String strVersionChangeReason; why it was changed
    public String strPriorCodebaseUrl; server://path1//version1.1/ and
server://path1/version1.2/
    public String strCodebaseUrl;
    public String strJavaSource; actual Java source code
    available for further use
    public vector vLinkedListOfEvolvedEntries;
    public Byte [] bytesOfEntryClass; provide an alternative
    to codebase for the
virtual machine to download the class.
}
public String spaceGuid;
public String spaceName;
public Vector vEvolvableEntries;
    }
```

The spaceGuid and spaceName are used to allow different versions to apply different instances of JavaSpaces within the virtual space. The vEvolvableEntries is a vector of EvolvingEntries that are sorted and contain a vector of past entries and their versions in the element vLinkedListOfEvolvingEntries.

It must be noted here that the public Byte[] line allows the virtual machine to have another option to access the codebase for the appropriate version. The agent that takes or reads the entry out of the space may not have access to the right version of a versioned entry in that agent's codebase. This line allows the agent to access the codebase as an object in the space. That is, the codebase version for that particular versioned entry is put in the space as an object and the agent can read it from the space rather than using HTTP to read it, as described above.

The toolbox will write the entry matrix object and distributed it across all of the persistent stores. Once the entry matrix is populated and copied to the individual JavaSpace™ instances, agents of different versions can use the matrix to create multiple entries of the same 'name' to co-exist in the same space without having to restart the space.

Figure 4:
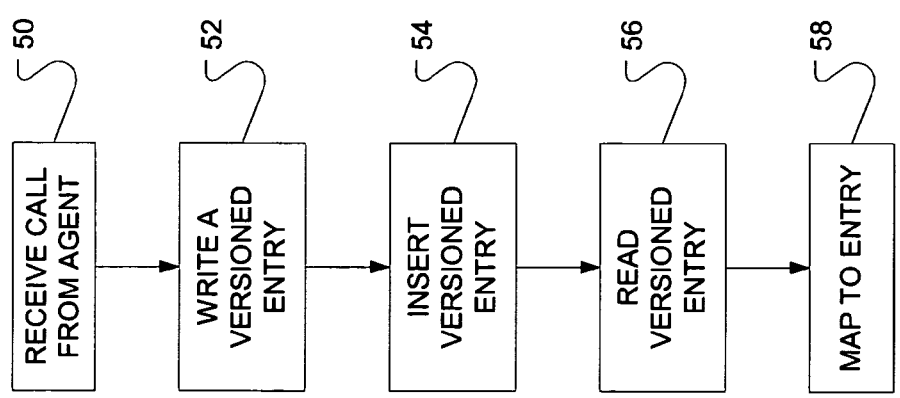
FIG. 4 shows a flowchart of an embodiment of a method to create an evolving entry.

Referring now to FIG. 4, an embodiment of a process for creating and writing multiple entries is shown in flowchart form. This embodiment will be discussed with regard to the agents discussed above, with no intention of limiting application of the invention or the scope of the claims. At 50, a call is received from an agent desiring to write an entry into the space. The receiver of the call is the interface, or agent layer. In this example, agent A will be an agent created under the version 1.1 codebase and agent B will be an agent created under the version 1.2 codebase. At 52, then, when the layer agent for agent A writes an entry, such as the PreferenceEntry discussed above, it is effectively writing out the PreferenceEntry__1.1, or the SiEntryName defined in the example above. This avoids all name collisions and the only elements that need to maintain this version connection is the entry matrix and the JavaSpace interface. In one embodiment, the conversion of the entry to the versioned entry is performed by the JavaSpace interface using the information in the entry matrix.

The versioned entry will then be operated upon according the write/notify or read/take operations discussed above. In the write/notify operation, a new object of type "PreferenceEntry__1.1" is created that maps all of the fields from the PreferenceEntry object actually written by the agent layer, to the versioned object to be inserted into the space. The versioned object is inserted into the space at 54. Once a versioned object has been inserted into the space, it may be taken or read, however these processes are optional.

In a read/take operation, the versioned entry is then mapped back into the general PreferenceEntry object. For example, if Agent A inserts the preferences for a given user, the versioned entry PreferenceEntry__1.1 results. If Agent B needs to take or read that entry in current systems, it would return an error, as the fields between the two versions are different, since agent B uses version 1.2. However, in implementing the invention, when agent B picks up the entry for the member associated with agent A at 54, the fields of PreferenceEntry__1.1 are mapped back into the general PreferenceEntry by the agent layer at 58, and agent B has made a match and now has the information needed. The agents are not aware of any of these processes. They are just writing and reading the object PreferenceEntry.

In one embodiment, the agents are defined with the version of the entry they should use. This may be dependent upon flags set with the agent is originally started. Both entry types are valid and neither collides. If a system were migrating from version 1.1 to version 1.2, fewer and fewer entries of version 1.1 would be made until the whole system uses version 1.2.

It is not necessary that a system migrate to a newer version. Both versions could be around forever. However, if the newer version has better functionality of faster processing or for some other reason is more desirable than the older version, the system would probably prefer to use only the newer version. For example, in a communications system, the external devices, such as telephones or web page interfaces, use a protocol that in turn have an agent that writes version 1.1 entries. As these devices are upgraded, they may begin using agents that write version 1.2 entries. While some devices are upgraded, others are not, so the system may continue to use both 1.1 and 1.2 versions until all of the devices are upgraded to use version 1.2. Eventually, all of the 1.1 version agents will become idle.

In an alternative embodiment, the agents can run as 'version unaware.' The agents would be notified when a change was made to the entry matrix. They would then re-read the entry matrix and start processing all entries with the latest version. This also avoids forcing the agents to be restarted.

Figure 5:
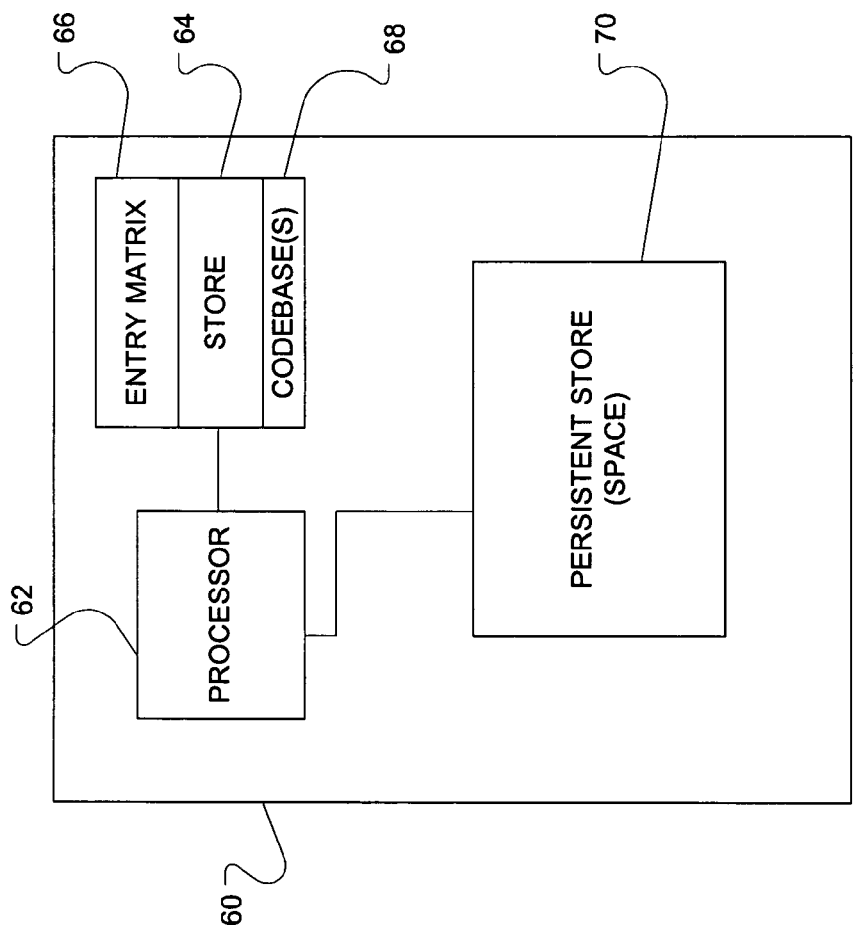
FIG. 5 shows an embodiment of a network device.

The agents and interfaces will typically be implemented in software as machine-readable instructions that, when executed, perform the processes of the invention. In some instances, the machine-readable code would be included on an article, such as a diskette, compact disc, or in a new processor used to upgrade an existing network device to allow embodiments of the invention to be implemented. Alternatively, the instructions could be deployed in a new network device. An example of a network device capable of implementing the processes of the invention is shown in FIG. 5.

The network device 60 may include a portion of the persistent store 70. JavaSpaces™ may be distributed across several different memories in several different devices, even though it may be defined as one space. The network device may also include a separate memory, or partitions of the same memory containing the portion of the space. The store 64 may include capacity for one or more codebases and the entry matrix for the space. These may also be distributed to other devices, similar to the distribution of the space.

In this manner, evolvable entries can be used in distributed computer systems, such as communication systems based upon Java™ and Jini™ and similar systems, without causing the underlying code to have to be restarted. It allows for more flexibility as well as easier upgradeability of systems, such as the Scalable Infrastructure™ system.

Thus, although there has been described to this point a particular embodiment for a method and apparatus for evolvable entries in persistent stores, it is not intended that such specific references be considered as limitations upon the scope of this invention except in-so-far as set forth in the following claims.

What is claimed is:

1. A method, comprising:
   receiving a call from a first agent desiring to write an entry into a persistent store having a notification service;
   receiving the entry as a general entry of a first version from the first agent;
   using an entry matrix that stores definitions of entries and contents of the entries, converting the entry to a versioned entry by mapping fields in the general entry to fields of a first versioned entry;
   inserting the versioned entry into the persistent store;
   using the notification service to provide notification to agents of insertion of the versioned entry;
   performing a lookup operation to locate the versioned entry by a second agent having a different codebase than a codebase of the first agent; and
   using the entry matrix, converting the versioned object to a general object by mapping the fields of the first versioned entry back to the fields of the general object allowing the second agent to make a match.

2. The method of claim 1, wherein receiving the call further comprises receiving a call from an agent associated with a calling party placing a telephone call to a receiving party.

3. The method of claim 1, wherein using the entry matrix further comprises accessing a copy of the entry matrix existing as an object in the persistent store.

4. The method of claim 1, converting the entry further comprises accessing the entry matrix to access a codebase for the versioned entry.

5. The method of claim 1, further comprising identifying the codebases of the first and second agents by setting flags upon execution of the agent.

6. The method of claim 1, the method further comprising:
   notifying agents when changes are made to the entry matrix to add a latest version; and
   directing the agents to read the entry matrix and process all entries in the persistent store having a latest version.

7. An article of machine-readable media having software that, when executed, cause a processor to:
   receive a call from a first agent desiring to write an entry into a persistent store having a notification service;
   receive the entry as a general entry of a first version from the first agent;
   use an entry matrix that stores definitions of entries and contents of the entries, to convert the entry to a versioned entry by mapping fields in the general entry to fields of a first versioned entry;
   insert the versioned entry into the persistent store;
   use the notification service to provide notification to agents of insertion of the versioned entry;
   perform a lookup operation to locate the versioned entry by a second agent having a different codebase than a codebase of the first agent; and
   use the entry matrix, to convert the versioned object to a general object by mapping the fields of the first versioned entry back to the fields of the general object allowing the second agent to make a match.

8. The article of claim 7, the software, when executed, further causes the processor to:
   notify agents when changes are made to the entry matrix to add a latest version; and
   direct the agents to read the entry matrix and process all entries in the persistent store having a latest version.

9. The article of claim 7, the software, when executed, further causes the processor to receive a call from an agent associated with a calling party placing a telephone call to a receiving party.

10. The article of claim 7, the software, when executed, further causes the processor to access a copy of the entry matrix existing as an object in the persistent store.

11. The article of claim 7, the software, when executed, further causes the processor to convert the entry by accessing the entry matrix to access a codebase for the versioned entry.

12. The article of claim 7, the software, when executed, further causes the processor to identify the codebases of the first and second agents by setting flags upon execution of the agent.

13. A network device, comprising:
   a persistent store having a notification service;
   a processor to:
      receive a call from a first agent desiring to write an entry into the persistent store;
      receive the entry as a general entry of a first version from the first agent;

use an entry matrix that stores definitions of entries and contents of the entries, converting the entry to a versioned entry by mapping fields in the general entry to fields of a first versioned entry;

insert the versioned entry into the persistent store;

use the notification service to provide notification to agents of insertion of the versioned entry;

perform a lookup operation to locate the versioned entry by a second agent having a different codebase than a codebase of the first agent; and use the entry matrix, converting the versioned object to a general object by mapping the fields of the first versioned entry back to the fields of the general object allowing the second agent to make a match.

14. A network device, comprising:

a means for storing having a notification service;

a means for:

receiving a call from a first agent desiring to write an entry into the persistent store;

receiving the entry as a general entry of a first version from the first agent;

using an entry matrix that stores definitions of entries and contents of the entries, converting the entry to a versioned entry by mapping fields in the general entry to fields of a first versioned entry;

inserting the versioned entry into the persistent store;

using the notification service to provide notification to agents of insertion of the versioned entry;

performing a lookup operation to locate the versioned entry by a second agent having a different codebase than a codebase of the first agent; and using the entry matrix, converting the versioned object to a general object by mapping the fields of the first versioned entry back to the fields of the general object allowing the second agent to make a match.

\* \* \* \* \*